US010402951B2

United States Patent
Ohno

(10) Patent No.: US 10,402,951 B2
(45) Date of Patent: Sep. 3, 2019

(54) IMAGE PROCESSING DEVICE AND IMAGE PROCESSING PROGRAM

(71) Applicant: SHIMADZU CORPORATION, Kyoto (JP)

(72) Inventor: Yoshinori Ohno, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 15/574,763

(22) PCT Filed: May 22, 2015

(86) PCT No.: PCT/JP2015/064823
§ 371 (c)(1),
(2) Date: Nov. 16, 2017

(87) PCT Pub. No.: WO2016/189601
PCT Pub. Date: Dec. 1, 2016

(65) Prior Publication Data
US 2018/0204312 A1 Jul. 19, 2018

(51) Int. Cl.
*G06T 5/00* (2006.01)

(52) U.S. Cl.
CPC ............. *G06T 5/007* (2013.01); *G06T 5/003* (2013.01); *G06T 2207/10116* (2013.01); *G06T 2207/20021* (2013.01)

(58) Field of Classification Search
None
See application file for complete search history.

(56) References Cited

U.S. PATENT DOCUMENTS 6,128,407 A * 10/2000 Inoue .................... G06T 11/001
358/504
2005/0254721 A1* 11/2005 Hagiwara ............... G06T 5/008
382/260

(Continued)

FOREIGN PATENT DOCUMENTS

| JP | 2005-323926 | 11/2005 |
| JP | 2009-050356 | 3/2009 |
| JP | 5579639 | 7/2014 |

OTHER PUBLICATIONS

PCT/JP2015/064823, ISR and Written Opinion, dated Aug. 11, 2015, 6 pages—Japanese; 1 page—English.

*Primary Examiner* — Fayyaz Alam
(74) *Attorney, Agent, or Firm* — Andrew F. Young, Esq.; Lackenbach Siegel, LLP

(57) ABSTRACT

An image processing element 4 (image processing apparatus) of the present invention, the benchmark value calculation element 41 calculates a benchmark value indicating the unevenness level of the brightness value from the brightness distribution in the proximity of pixels and the area-dividing element 43 sets up the enhancement level (property of the filter or intensity of the filter) corresponding to the unevenness level of the benchmark value per se every divided divided-area, so that an adjustment corresponding to the level of the brightness value is unnecessary and the enhancement processing can be executed in high-accuracy from a low-brightness portion to a high-brightness portion. In addition, no setting depending on the brightness value is mandatory, so that a fine setting and a fine adjustment prior to imaging is unnecessary and a highly-accurate processing can be executed securely even when the imaging environment and an imaging condition change.

3 Claims, 4 Drawing Sheets

(56) References Cited

U.S. PATENT DOCUMENTS

| | | | |
|---|---|---|---|
| 2011/0305381 A1* | 12/2011 | Ohno | A61B 6/5211 382/132 |
| 2013/0100310 A1* | 4/2013 | Ebihara | G06K 9/40 348/222.1 |
| 2016/0180504 A1* | 6/2016 | Kounavis | G06T 5/002 348/241 |
| 2018/0176560 A1* | 6/2018 | Mishurovskiy | H04N 19/176 |

* cited by examiner

IMAGE PROCESSING DEVICE AND IMAGE PROCESSING PROGRAM

CROSS REFERENCE TO RELATED APPLICATIONS

This application relates to and claims priority from JP PCT Ser. No. PCT/JP2015/064823 filed May 22, 2015, the entire contents of which are incorporated herein by reference.

TECHNICAL FIELD

The present invention relates to an image processing apparatus and an image processing program and particularly relates a technology that enhances brightness-and-sharpness and contrast of the image.

BACKGROUND

According to conventional methods, an enhancement level of high-frequency enhancement processing is set up corresponding to the largeness of value based on the benchmark which indicates unevenness (scattering) of pixels of an attention area. However, even when degrees of variability of pixels relative to the attention pixels are the same, the larger the pixel value is, the larger the absolute value of variation trends to be, and reversely the smaller the pixel value is, the smaller the absolute value of variation trends to be, with regard to unevenness of pixels in general. Specifically, with regard to the benchmark value of unevenness (dispersion), the larger brightness value is, the larger the benchmark value trends to be, and reversely the smaller brightness value is, the smaller the benchmark value trends to be.

Therefore, given a corresponding relationship is set up to meet a characteristic when the brightness value is large, an unevenness, of which brightness value is small, becomes undetectable, so that the benchmark value becomes small and consequently, the enhancement level set-up corresponding thereto cannot be correctly set up. Further, in contrast, when given a corresponding relationship is set up to meet a characteristic when the brightness value is small, an unevenness, of which brightness value is large, is overly detected, so that the benchmark value becomes large and consequently, the enhancement level set-up corresponding thereto is strongly set up. As results, it is problematic that given the corresponding relationship is set up to meet the characteristic when the brightness value is small, the noise component is amplified, so that quality of the image deteriorates. Accordingly, the subject region is speculated based on the detected representative brightness value so that the enhancement level is set up to solve the problem as set forth above (e.g., see Patent Document 1).

RELATED PRIOR ART DOCUMENTS

Patent Document

Patent Document 1
Patent Document 1: JP Patent 5579639 B1

ASPECTS AND SUMMARY OF THE PRESENT INVENTION

Objects to be Solved

Nevertheless, even if the method disclosed in the Patent Document 1, JP5579639, is applied, the corresponding relationship between the representative brightness value and the enhancement coefficient must be possessed as the same number of the areas and the conditions in advance; so that it can be problematic that time for preparation to image is much longer, a number of settings is large, and the operation is more complicated. In addition, even when the subject is the same, the level of brightness value may vary depending on an imaging environment and imaging conditions, so that it is difficult to speculate constantly and securely the area from the brightness value. Therefore, it is not guaranteed that the setting value is always an adequate value relative to the subject, so that it can be problematic that the processing accuracy is not constant and secure.

Considering such facts, the purpose of the present invention is to provide an image processing apparatus and an imaging processing program therefor that can perform constantly and securely a processing with a very high-accuracy even when the imaging environment and the imaging condition have changed.

Means for Solving the Problem

The present invention comprises the following structure to solve such problem. Specifically, an image processing apparatus of the present invention is an image processing apparatus that processes an input image comprising: a benchmark value calculation element that calculates a benchmark value indicating an unevenness level of brightness value from brightness distribution in a proximity of a pixel relative to each of pixels of the input image; a pixel detection element that detects pixels having a peak value relatively in the proximity area and a benchmark value higher than a predetermined range as a detection pixel relative to the benchmark value with regard to each pixel; an area-dividing element that classifies and area-divides the pixels of the input image to a plurality of area-divided areas based on a pixel area consisting of the detection pixels; and a processing switching element that executes respectively different processings by switching a property of a filter or an intensity of the filter every an area-divided area According to the aspect of the image processing apparatus of the present invention, a benchmark value that indicates the unevenness level of the brightness value is calculated from the brightness distribution in the proximity of pixels and the enhancement level (property of the filter or intensity of the filter) is set up corresponding to the unevenness level of the benchmark value per se every area-divided area with regard to each of pixels of the input image, so that an adjustment corresponding to the level of the brightness value is unnecessary and the enhancement processing can be executed in high-accuracy from a low-brightness portion to a high-brightness portion. In addition, no setting depending on the brightness value is mandatory, so that a fine setting and a fine adjustment prior to imaging is unnecessary and a highly-accurate processing can be executed securely even when the imaging environment and an imaging condition change. In addition, a pixel detection and further an area-dividing are executed based on the relative peak value in the proximity thereof, so that no erroneous detection and no erroneous operation due to such as noise take place.

It is preferable that the filter intensity is set up to be weak along the distance between the pixel and the target pixel that is getting long and the processing relative to the target pixel is executed using such set-up filter. When the detection pixel is a target pixel, the filter intensity is set up to be strongest and subsequently, the processing relative to the target pixel (i.e., the detection pixel) is executed using such set-up filter.

Then, the filter intensity is set up to be weak along the distance between the pixel and the target pixel that is long and the processing relative to the target pixel is executed using the set-up filter. The processing can be executed using the strongly set-up filter with regard to the pixel having a relatively large benchmark value, which indicates the unevenness level in the proximity thereof, (i.e., detection pixel). It is supposed that the benchmark value of the target pixel becomes relatively small along the distance from the detection pixel in the proximity thereof, which becomes long. Accordingly, the pixel having the long-distance from the detection pixel and a relatively small benchmark value can be subject to processing using the weakly-set-up filter.

It is preferable that the area-dividing element area-divides the area into a plurality of area-divided areas in accordance with the distance from the detection pixel as set forth above, it is supposed that the benchmark value of the target pixel becomes relatively small along the distance from the detection pixel in the proximity thereof, which becomes long. Therefore, when area-dividing the area into a plurality of area-divided areas in accordance with the distance from the detection pixel, changing the property of the filter or the intensity of the filter every area-divided area and executing the different processing respectively, the enhancement processing can be executed in high-accuracy. When the area is area-divided to a plurality of area-divided areas, the number of area-dividing is not particularly limited.

In addition, an image processing program, according to the present invention, that is the image processing program that executes an image processing for an input image using a computer comprises the steps of: calculating a benchmark value indicating an unevenness level of brightness value from brightness distribution in a proximity of a pixel relative to each of pixels of the input image; detecting pixels having a peak value relatively in the proximity area thereof and a benchmark value higher than a predetermined range as a detection pixel relative to the benchmark value with regard to each of the pixels; area-dividing the pixels of the input image classifies and divides to a plurality of area-divided areas based on said pixel area consisting of the detection pixels; and switching a processing that executes respectively different processings by changing a property of a filter or an intensity of the filter every area-divided areas; wherein a computer executes a processing at each of steps.

According to the aspect of the image processing program of the present invention, a computer executes the steps of calculating the benchmark value, area-dividing and switching processings, so that each processing can be executed in high-accuracy regardless of changes of the imaging environment and the imaging condition.

Effect of the Invention

According to the aspect of the image processing apparatus of the present invention, a benchmark value that indicates the unevenness level of the brightness value is calculated from the brightness distribution in the proximity of pixels and the enhancement level (property of the filter or intensity of the filter) is set up corresponding to the unevenness level of the benchmark value per se every area-divided areas with regard to each of pixels of the input image, so that each processing can be executed in high-accuracy regardless of changes of the imaging environment and the imaging condition.

In addition, according to the aspect of the image processing program of the present invention, a computer executes the steps of calculating the benchmark value, area-dividing and switching processings, so that each processing can be executed in high-accuracy regardless of changes of the imaging environment and the imaging condition.

EMBODIMENT

Figure 1:
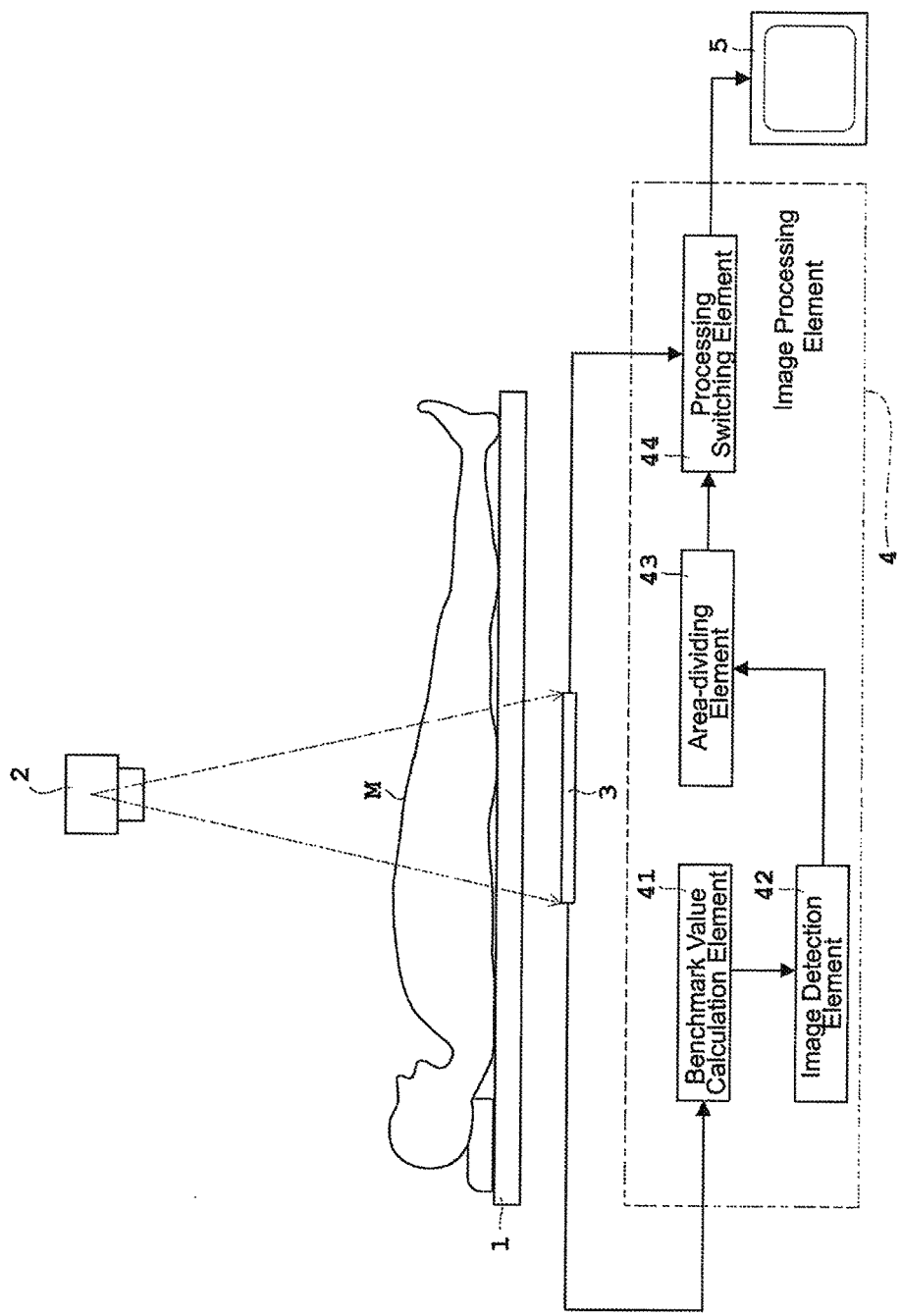
FIG. 1 is a block diagram illustrating a radiation imaging apparatus.
Figure 2:
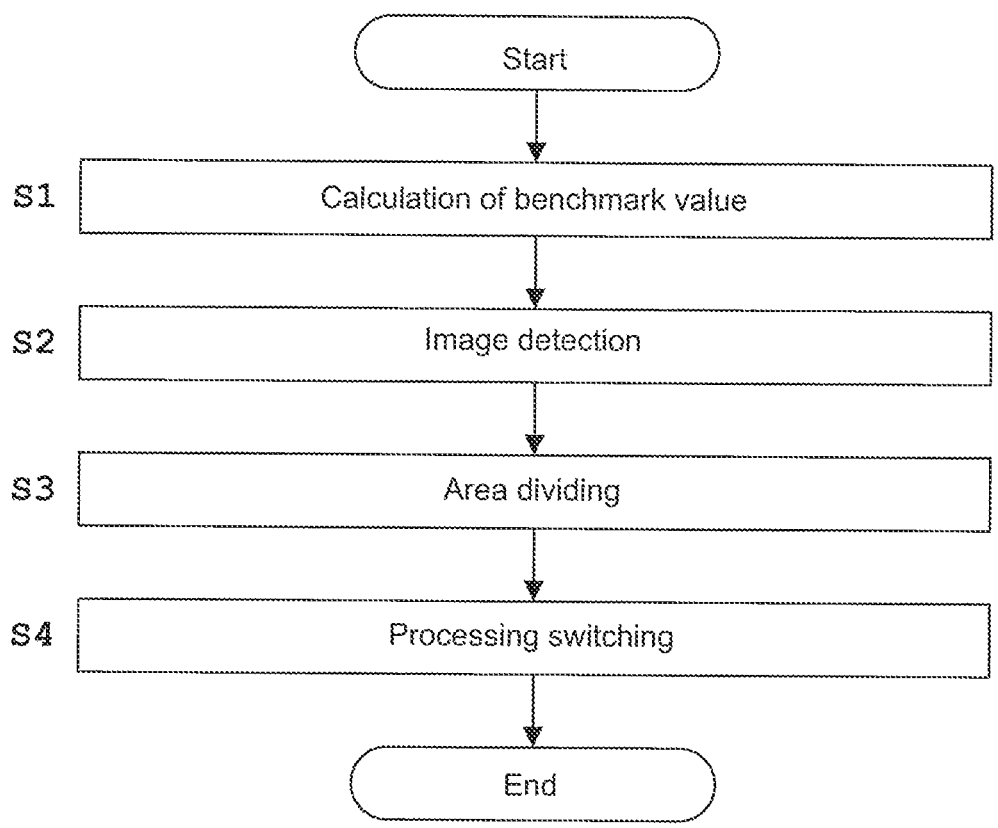
FIG. 2 is a flow-chart illustrating the flow of a series of image processings according to the aspect of the Embodiment.
Figure 3:
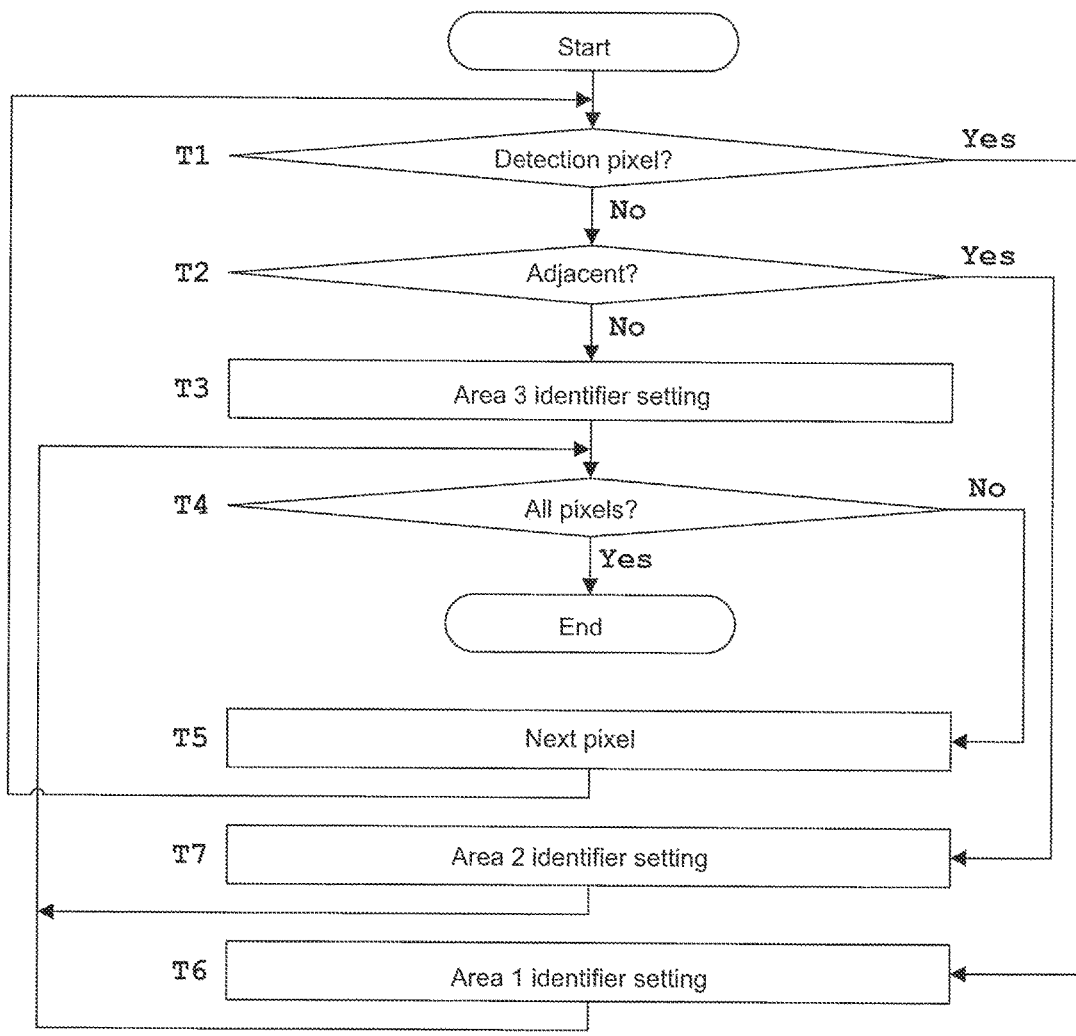
FIG. 3 is a flow-chart illustrating the flow of the processing in an area-dividing element.
Figure 4:
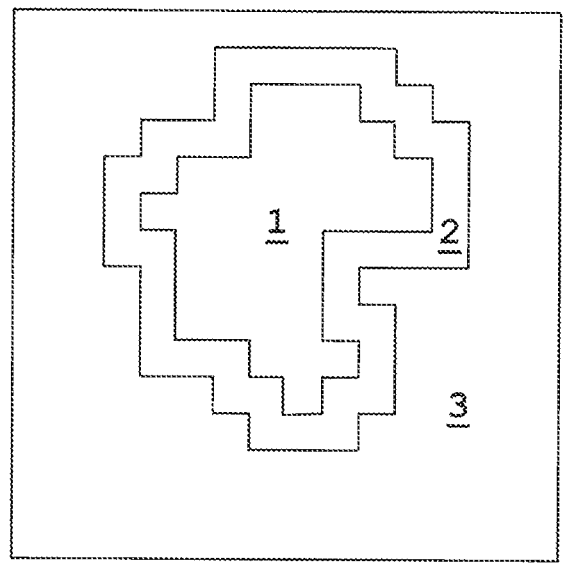
FIG. 4 is a schematic view illustrating an image following an area-dividing.

Referring to Figures, the inventor sets forth the Embodiment of the present invention. FIG. 1 is a block diagram illustrating a radiation imaging apparatus, FIG. 2 is a flow-chart illustrating the flow of a series of image processings according to the aspect of the Embodiment, FIG. 3 is a flow-chart illustrating the flow of the processing in an area-dividing element, and FIG. 4 is a schematic view illustrating an image following an area-dividing. According to the present Embodiment, the inventor sets forth an input image, as an example, that is a radiograph obtained as a target of an image processing using a radiation imaging apparatus.

Referring to FIG. 1, according to the aspect of the present embodiment, the radiation imaging apparatus comprises: a table loading a subject; a radiation source 2 (e.g., an X-ray tube) that irradiates a radiation (e.g., an X-ray) to a subject M; a flat panel detector (hereafter FPD) 3 that detects the irradiated radiation from the radiation source 2 and transmitted the subject M; an image processing element 4 that executes an image processing based on the radiation detected by the FPD 3; and a display element 5 that displays a radiation image (radiograph) subjected to a variety of image processings by the image processing element 4. The display element 5 comprises a display means, such as a monitor and a television. According to the present Embodiment, the image processing element 4 is embedded in the radiation imaging apparatus. The image processing element 4 corresponds to the image processing apparatus of the present invention.

Further, the radiation detector can be any other radiation detector other than the flat panel-type radiation detector (FPD). For example, in the case of an X-ray detector, an image intensifier is applied. The radiograph obtained by using such an analogue radiation detector is an analogue image, so that such analogue image can be sent to the image processing element 4 to generate a digital image thereof by a digital conversion. Then, such digital image is an input image according to the aspect of the present Embodiment. Hereinafter, it is noted that number is expressed as a decimal number, but the number is actually processed as a binary digit.

The above image processing element 4 comprises such as a central processing unit (CPU) and so forth. In addition, the CPU of the image processing element 4 implements the image processing corresponding to the programs, which execute a variety of image processings and are written and stored in the memory medium typically such as ROM (read-only memory), by reading out such programs and so forth from such memory medium. Particularly, the benchmark value calculation element 4 set forth later, an image detection element 42, an area-dividing element 43 and a processing switching element 44 execute the programs regarding a calculation of the benchmark value, a detection of the detection pixel, an area-dividing and switching the processing, so that the calculation of the benchmark value and the detection of the detection pixels, area-dividing and switching the processing, corresponding to the programs thereof, can be executed (refer to the flow-chart in FIG. 2). The programs regarding the calculation of the benchmark value, the detection of the detection pixel, the area-dividing and switching the processing corresponds to the image processing programs of the present invention.

The radiographic image obtained by detecting with the FPD 3 is sent to the image processing element 4 as an input image. The image processing element 4 further comprises: a benchmark value calculation element 41 that calculates a benchmark value indicating the unevenness level of the brightness value from the brightness distribution relative to each of pixels of the input image; a pixel detection element 42 that detects pixels having a peak value relatively in the proximity area and a benchmark value higher than a predetermined range as a detection pixel relative to the benchmark value with regard to each of pixels; an area-dividing element 43 that classifies and area-divides the pixels of the input image to a plurality of area-divided areas based on the pixel area consisting of the detection pixels; and a processing switching element 44 that executes respectively different processings by changing a property of a filter or an intensity of the filter every area-divided areas. The benchmark value calculation element 41 corresponds to the benchmark value calculation means of the present invention, the pixel detection element 42 corresponds to the pixel detection means of the present invention, the area-dividing element 43 corresponds to the area-dividing means of the present invention and the processing switching element 44 corresponds to the processing switching means of the present invention.

The FPD 3 is connected to the benchmark value calculation element 41 and the image processing switching element 44 to which the radiographic image (input image) is sent to each. In addition, the benchmark value calculation element 41 is connected to the pixel detection element 42 and the benchmark value is sent to the pixel detection element 42. In addition, the pixel detection element 42 is connected to the area-dividing element 43 and the detection pixel is sent to the area-dividing element 43. In addition, the area-dividing element 43 is connected to the processing switching element 44 and the divided area is sent to the processing switching element 44. An image subjected to the enhancement processing by the processing switching element 44 is sent to the display element 5 to be displayed.

Here, the brightness value subjected to a gradation-conversion of the pixel value is treated as the same as the pixel value before the gradation-conversion. Therefore, the steps S1-S4 in FIG. 2 can be executed using the pixel value before the gradation-conversion or the steps S1-S4 in FIG. 2 can be executed using the brightness value after the gradation-conversion.

(Step S1) Calculation of a Benchmark Value

The benchmark value calculation element 41 calculates a benchmark value indicating an unevenness level of brightness value from brightness distribution in a proximity of the pixel relative to each of pixels of the input image. According to the present Embodiment, the data of pixel values, which are included in the rectangular range (e.g., image having 9×9 pixels) having a predetermined size, in which the center thereof is the attention pixel, are obtained from the FPD 3 and the standard deviation thereof is calculated as the benchmark value. The above operation is also applied to calculation relative to all pixels in the image. In such way, the next pixel (e.g., adjacent pixel) is newly set up as the attention pixel following calculation of the benchmark value and subsequently, the range of the proximity of the pixels having the newly set-up attention pixel as the center thereof (i.e., now, rectangular range) and the range (rectangular range) of the proximity of the previous pixels are scanned so as to superimpose to one another.

In addition, the range (rectangular range) of the proximity of the newly set-up pixels and the range (rectangular range) of the proximity of the previous pixels can be scanned so as not to superimpose to one another. When the benchmark value is calculated at the end portion by scanning until the end portion, given the range is narrower than the range (rectangular range) of the proximity of the predetermined size, the pixel range can be virtually generated by e.g., folding back the pixels and pasting the pixel value. When the benchmark value is calculated at the end portion by scanning until the end portion, the size of the range (rectangular range) of the proximity of the pixels can be modified as set forth later.

In addition, the size of the range (rectangular range) of the proximity of the pixels can be modified in accordance with the image size and the subject size. In addition, the range of the proximity of the pixels is not limited to the rectangular range as set forth above and such range can be other kinds of range (e.g., circular range) having a constant distance from the attention pixel as the center thereof. Now, the circular shape is set forth, but the pixel is a square-shape dot, so that it is noted that actually such shape is a polygonal shape that is infinitely close to a circle.

In addition, the benchmark value indicating the unevenness level of the brightness value (pixel value) is not limited to the standard deviation set forth above and can be any other value as long as such value is a benchmark, e.g., a dispersion value and a divergence from the average value, that indicates statistically the unevenness level of brightness value. Such step S1 corresponds to the step of calculating a benchmark value of the present invention.

(Step S2) Pixel Detection

The pixel detection element 42 detects pixels having a peak value relatively in the proximity area thereof and the benchmark value higher than a predetermined range as a detection pixel relative to the benchmark value with regard to each of the pixels.

According to the present Embodiment, the data of pixel values, which are included in the rectangular range (e.g., image having 9×9 pixels) having a predetermined size, in which the center thereof is the attention pixel, are obtained from the benchmark value calculation element 41 and detects the pixel having a fairly large value in the proximity thereof comparing an average value (refer to the first term of left-side of the formula (1)) of benchmark value data indicated in the following formula (1) as detection pixels. Specifically, if the benchmark value is I(x, y) relative to the attention pixel is P(x, y) and the proximity area is $R_{xy}$, the pixel meeting the following formula (1) is detected as a detection pixel.

Mathematical Formula 1

$$\text{average}[I(i,j)|I(i,j) \in R_{xy}] \times \alpha \leq I(x,y) \tag{1}$$

In addition, α is a constant having approximately 10-12. However, the specific value of α is not particularly limited.

A discrimination number or an identifier (sign and letter) that discriminates the area is set up for the detected detection-pixel.

In addition, the method that detects a pixel is not limited thereto. A method can detect the pixel out of the range of the set-up distribution (deviation) by calculating the standard deviation of the benchmark value or the dispersion value. Such step S2 corresponds to the step of detecting the pixel of the present invention.

(Step S3) Area-Dividing

The area-dividing element 43 that classifies and area-divides the pixels of the input image to a plurality of area-divided areas based on the pixel area consisting of the detection pixels. According to the present Embodiment, the area-dividing element 43 such pixels to a class of the detection pixel detected by the pixel detection element 42, a class of pixel in the proximity of the detection pixels and a class of other pixels. A discrimination number or an identifier (sign and letter) that discriminates the area is set up for each of pixels.

FIG. 3 is a flow-chart illustrating the flow of the processing in an area-dividing element 43.

(Step T1) Detection Pixel

It is determined whether the target pixel (i.e., attention pixel) is a detection pixel detected by the pixel detection element 42 or not. If not the detection pixel, proceed to the Step T2. If the detection pixel, proceed to the Step T6.

(Step T2) Proximate

It is determined whether the attention pixel is a proximate (e.g., adjacent) pixel to the detection pixel or not. If the pixel is not-adjacent to the detection pixel, proceed to the Step T3. If the pixel adjacent to the detection pixel, proceed to the Step T7. In the step T2, setting of the area is not limited to the proximate pixel. For example, it can be determined whether the attention pixel is in a constant range from the detection pixel or not.

(Step S3) Set-Up of the Identifier of the Area 3

If the pixel not-adjacent to the detection pixel, an identifier of the area 3 is set up and proceed to the Step T4.

(Step T4) All Pixels

Investigate whether all pixels are determined whether the decision is made or not, and if not-all pixels are decided, proceed to the step S5. When all pixels are decided, the steps T1-T7 end.

(Step T5) Next Pixel

When all pixels have not been decided, the next pixel (e.g., adjacent pixel) is set up as an attention pixel, so that the decision moves to the next pixel and the same decision and setting are executed while returning to the step T1.

(Step T6) Set-Up of the Identifier of the Area 1

If the detection pixel, an identifier of the area 1 is set up and proceed to the step T4.

(Step T7) Set-Up of the Identifier of the Area 2

If the pixel is proximate to the detection pixel, an identifier of the area 2 is set up and proceed to the step T4.

In such way, the pixels in the input image are classified and area-divided to a plurality of area-divided areas (here, 3 areas) by executing the steps T1-T7. One example of the image subjected to the area-diving is illustrated in FIG. 4. The sign 1 in FIG. 4 is the area of the detection pixel 1 (identifier of the area 1), the sign 2 in FIG. 4 is the area of the detection pixel 2 (identifier of the area 2), and the sign 3 in FIG. 4 is the area of the detection pixel 3 (identifier of the area 3), Here, the pixels thereof are divided to three areas, but the number is not limited thereto. The pixels thereof can be further finely divided depending on the distance from the detection pixel detected by the pixel detection element 42. In addition, the area due to the detection result is expanded by such as a morphology operation and so forth and subsequently, the area-dividing can be executed following the area in the proximity of the detection pixels (identifier of the area 2 in FIG. 4) is detected by obtaining the difference between the area after expanded and the area before expanded. The step S3 (refer to FIG. 3) including the steps T1-T7 (refer to FIG. 3) corresponds to the step of area-dividing of the present invention.

(Step S4) Processing Switching

The processing switching element 44 executes respectively different processings by changing the property of the filter or the intensity of the filter every area-divided areas. The filter is a filter that is generally used for enhancing processing of an image. According to the aspect of the present Embodiment, for example, an unsharp masking filter (refer to the following formula (2)) is applied.

Mathematical Formula 2

$$\begin{pmatrix} \frac{-k}{s^2} & L & \frac{-k}{s^2} \\ M & 1+k\left(1-\frac{1}{s^2}\right) & M \\ \frac{-k}{s^2} & L & \frac{-k}{s^2} \end{pmatrix} \quad (2)$$

In addition, s is a filter size and k is a constant.

The enhancement level is set up to be weak in order of the area of the detection pixel (identifier of the area 1 in FIG. 4) detected by the pixel detection element 42, the area in a proximity of the detection pixel (identifier of the area 2 in FIG. 4), and the other area (identifier of the area 3 in FIG. 4). For example, the filter size is fixed, and the k value is set up as 2, 1, 0.5, as set forth above. Needless to say, other values can be set up as long as the enhancement level is in order.

In addition, the value of the constant k is fixed, and the filter size can be changed, every area-divided area. In such case, a large value of the filter size is set up for the area at which the enhancement level is high. In addition, both filter size and constant k can be modified together. Even when the number of the divided areas is more than 4, the same setting is executed.

In addition, with regards to the area at which the enhancement level is in-between, an average value of the processing result, in which the strong enhancement level is set up, and the processing result, in which the weak enhancement level is set up, can be applied to an output. However, the enhancement processing is not limited thereto, and any other known method can be applied, as long as the filter processing enhances the contrast and the edge of the image. Such step S4 corresponds to the processing switching step of the present invention.

The display element 5 receives a processed image (data of the processing result) from the processing switching element 44 and output-displays to a display device such as a monitor. In addition, an output result is written and stored in a memory medium such as a hard disk or a memory (not shown in FIG.) represented by RAM (random access memory) and so forth.

According to the aspect of the image processing element 4 of the present invention, a benchmark value that indicates the unevenness level of the brightness value is calculated from the brightness distribution in the proximity of pixels and the enhancement level (property of the filter or intensity of the filter) is set up corresponding to the unevenness level of the benchmark value per se every area-divided area, so that an adjustment corresponding to the level of the brightness value is unnecessary and the enhancement processing can be executed in high-accuracy from a low-brightness portion to a high-brightness portion. In addition, no setting depending on the brightness value is mandatory, so that a fine setting and a fine adjustment prior to imaging is unnecessary and a highly-accurate processing can be executed securely even when the imaging environment and an imaging condition change. In addition, a pixel detection and further an area-division are executed based on the relative peak value in the proximity thereof, so that no erroneous detection and no erroneous operation due to such as noise take place.

According to the aspect of the present Embodiment, it is preferable that the filter intensity is set up to be weak along the distance between the pixel and the target pixel that is long and the processing relative to the target pixel is executed using the set-up filter. When the detection pixel is a target pixel, the filter intensity is set up to be strongest (e.g., k value is 2 in the case of unsharp mask filter) and subsequently, the processing relative to the target pixel (i.e., the detection pixel) is executed using such set-up filter. In accordance with the distance, which is getting longer, between the detection pixel and the target pixel, the filter intensity is set up to be weak (e.g., k value is, 0.5 in the case of unsharp mask filter) and subsequently, the processing relative to the target pixel is executed using such set-up filter. The processing can be executed using the strongly set-up filter with regard to the pixel having a relatively large benchmark value, which indicates the unevenness level in the proximity thereof, (i.e., detection pixel). It is supposed that the benchmark value of the target pixel becomes relatively small along the distance from the detection pixel in the proximity thereof, which becomes long. Accordingly, the pixel having the long-distance from the detection pixel and a relatively small benchmark value can be subject to processing using the weakly-set-up filter.

According to the aspect of the present Embodiment, referring to FIG. 4, it is preferable that the area-dividing element 43 divides the area into a plurality of area-divided areas (3 areas in FIG. 4) along a distance from the detection pixel. As set forth above, it is supposed that the benchmark value of the target pixel becomes relatively small along the distance from the detection pixel in the proximity thereof, which becomes long. Therefore, when area-dividing the area into a plurality of area-divided areas in accordance with the distance from the detection pixel, changing the property of the filter or the intensity of the filter every area-divided area and executing the different processing respectively, the enhancement processing can be executed in high-accuracy. When the area is area-divided to a plurality of area-divided areas, the number of area-dividing is not particularly limited.

In addition, according to the image processing program of the present Embodiment, the steps S1-S4 in FIG. 2 corresponding to the step of calculating a benchmark value, the step of area-dividing and the step of switching a processing are executed by a computer, so that a contrast of the area to be enhanced can be optimally enhanced.

The present invention is not limited to the aspect of the Embodiment set forth above and further another alternative Embodiment can be implemented set forth below.

(1) According to the aspect of the present Embodiment as set forth above, the inventor sets forth an input image as the image processing target, which is a radiograph obtained using an radiation imaging apparatus as an example, but the input image is not particularly limited and, for example, a digital image obtained using a digital image imaging apparatus such as a digital camera and a digital video camera and so forth, or a digital image obtained by digital conversion from an analog image as an input image. For example, the nuclear medicine data of the subject, to whom a radiopharmaceutical is administered, that are obtained using a nuclear medicine diagnostic device can be applied to the input image.

(2) According to the aspect of the Embodiment as set forth above, the present invention is applied to the radiation imaging apparatus for medicine, in which the subject is a human, but the present invention can be applied to a nondestructive inspection system that images the inside structure of the baseboard other than a human.

(3) According to the aspect of the Embodiment as set forth above, an image processing element is embedded in an image processing apparatus, but the image processing element (image processing apparatus) can be standalone as the radiation imaging apparatus is an external device.

FIELD OF THE INVENTION

As set forth above, the present invention is suitably applicable to a radiation imaging apparatus and a digital imaging apparatus such as a digital camera and a digital video camera.

REFERENCE OF SIGNS

4 Image processing element
41 Benchmark value calculation element
42 Pixel detection element
43 Area-dividing element
44 Processing switching element
I (x, y) Benchmark value

What is claimed is:

1. An image processing apparatus, that processes an input image comprising:
   a benchmark value calculation element that calculates a benchmark value for each of pixels of the input image, the benchmark value indicating an unevenness level of a brightness value from a brightness distribution in a proximity of the each of the pixels;
   a pixel detection element that detects detection pixels, the detection pixels each having a peak in the benchmark value within its proximity area and having a benchmark value that is higher than a predetermined threshold;
   an area-dividing element that divides said plurality of pixels of said input image to divisional areas;
   a processing switching element that applies different filters for each of the divisional areas.

2. The image processing apparatus according to claim 1, wherein:
   at least one of the filters has a filter intensity is set up to be weak along a distance between at least one of said detection pixels and a target pixel, which is getting long, and said processing switching element executes a processing relative to said target pixel using said at least one of the filters.

3. The image processing apparatus according to claim 1, wherein:

said area-dividing element divides an area into a plurality of areas in accordance with a distance from at least one of said detection pixels.

\* \* \* \* \*